(12) United States Patent
Huddy

(10) Patent No.: US 11,098,485 B2
(45) Date of Patent: Aug. 24, 2021

(54) FIRE BARRIER BUILDING PRODUCT AND METHOD AND SYSTEM FOR MAKING SAME

(71) Applicant: LOUISIANA-PACIFIC CORPORATION, Nashville, TN (US)

(72) Inventor: Michael D. Huddy, Orono, MN (US)

(73) Assignee: LOUISIANA-PACIFIC CORPORATION, Nashville, TN (US)

(*) Notice: Subject to any disclaimer, the term of this patent is extended or adjusted under 35 U.S.C. 154(b) by 0 days.

(21) Appl. No.: 16/714,751

(22) Filed: Dec. 15, 2019

(65) Prior Publication Data

US 2020/0115900 A1 Apr. 16, 2020

Related U.S. Application Data

(63) Continuation of application No. 14/887,004, filed on Oct. 19, 2015, now Pat. No. 10,508,438.

(60) Provisional application No. 62/066,669, filed on Oct. 21, 2014.

(51) Int. Cl.
| | |
|---|---|
| *E04C 3/29* | (2006.01) |
| *B05D 7/06* | (2006.01) |
| *B05D 7/24* | (2006.01) |
| *B05D 7/00* | (2006.01) |
| *B05D 3/00* | (2006.01) |
| *B05D 3/12* | (2006.01) |

(52) U.S. Cl.
CPC ............ *E04C 3/29* (2013.01); *B05D 7/06* (2013.01); *B05D 7/24* (2013.01); *B05D 7/58* (2013.01); *B05D 3/002* (2013.01); *B05D 3/007* (2013.01); *B05D 3/12* (2013.01); *B05D 2203/20* (2013.01)

(58) Field of Classification Search
CPC ...... E04C 3/29; E04C 3/14; E04C 2003/0452; E04C 2003/0434; E04C 2003/0413; E04C 3/06; E04B 1/944; E04B 1/945
See application file for complete search history.

(56) References Cited

U.S. PATENT DOCUMENTS

| | | | | |
|---|---|---|---|---|
| 3,369,929 | A * | 2/1968 | Petersen | E04B 1/944 428/469 |
| 4,572,862 | A * | 2/1986 | Ellis | C04B 28/02 106/686 |
| 4,818,595 | A * | 4/1989 | Ellis | C04B 28/02 106/688 |
| 4,974,389 | A * | 12/1990 | Onysko | B27M 3/0026 144/347 |
| 5,039,454 | A * | 8/1991 | Policastro | C04B 28/32 106/18.11 |
| 5,260,372 | A * | 11/1993 | Toporcer | C08K 3/04 524/785 |

(Continued)

*Primary Examiner* — Rodney Mintz
(74) *Attorney, Agent, or Firm* — Wayne Edward Ramage; Baker Donelson

(57) ABSTRACT

Methods and processes for depositing a fire resistant barrier on a construction material involve coating exposed webbing of, for instance, an I-joist with a fire-resistant material using a wetting layer and a thickening layer. A time period between depositing the wetting layer and thickening layer is controlled to facilitate complete wetting of the exposed webbing. Filler such as fiberglass may be included in the thickening layer. The wetting and thickening layers may be deposited on the webbing in the same application. The construction material, such as the I-joist, may then be subjected to a curing treatment and additional curing period followed by coating the second side using a similar methodology.

8 Claims, 7 Drawing Sheets

(56) References Cited

U.S. PATENT DOCUMENTS

| | | | | |
|---|---|---|---|---|
| 5,356,446 A * | 10/1994 | Smetana | C04B 14/185 | 106/675 |
| 5,647,180 A * | 7/1997 | Billings | E04B 1/942 | 52/268 |
| 6,245,842 B1 * | 6/2001 | Buxton | C09D 5/18 | 524/101 |
| 6,309,740 B1 * | 10/2001 | Shu | C04B 14/208 | 252/605 |
| 7,595,092 B2 * | 9/2009 | Huddy | B32B 17/02 | 156/166 |
| 7,921,800 B2 * | 4/2011 | Huddy | C09K 21/02 | 118/663 |
| 8,458,971 B2 * | 6/2013 | Winterowd | C09D 15/00 | 52/232 |
| 9,663,943 B2 * | 5/2017 | Dimakis | E04B 1/26 | |
| 9,963,638 B2 * | 5/2018 | Vellrath | E04B 1/944 | |
| 10,508,438 B2 * | 12/2019 | Huddy | E04C 3/12 | |
| 10,533,318 B1 * | 1/2020 | Miller | E04C 3/06 | |
| 2006/0174798 A1 * | 8/2006 | Churchill | C09D 5/20 | 106/2 |
| 2008/0044648 A1 * | 2/2008 | Billings | B32B 13/06 | 428/332 |
| 2013/0000239 A1 * | 1/2013 | Winterowd | E04B 1/944 | 52/515 |
| 2015/0010699 A1 * | 1/2015 | Vellrath | C09D 5/18 | 427/140 |
| 2015/0020476 A1 * | 1/2015 | Winterowd | C09D 175/06 | 52/837 |
| 2016/0115686 A1 * | 4/2016 | Huddy | B05D 1/30 | 427/206 |
| 2017/0081844 A1 * | 3/2017 | Dimakis | E04B 1/944 | |
| 2017/0321418 A1 * | 11/2017 | Tremblay | E04C 3/122 | |

\* cited by examiner

FIRE BARRIER BUILDING PRODUCT AND METHOD AND SYSTEM FOR MAKING SAME

This application is a continuation of U.S. patent application Ser. No. 14/887,004, filed Oct. 15, 2015, which claims benefit of and priority to U.S. Provisional Application No. 62/066,669, filed Oct. 15, 2014, and is entitled to those filing dates for priority. The specifications, figures, and complete disclosures of U.S. Provisional Application No. 62/066,669 and U.S. patent application Ser. No. 14/887,004 are incorporated herein in their entireties by specific reference for all purposes.

FIELD OF INVENTION

The present invention relates to systems, methods and products that treat a building material with fire-resistant coatings.

BACKGROUND OF THE INVENTION

In the building industry, dimensional wood floor joists and rafters have typically been the preferred materials for supporting floors and roofs. More recently, I-joists have been replacing these materials. I-joists are wooden joists with an I-shaped configuration, including two flanges separated by a web. The flanges of the I-joist are typically arranged so that their width rests horizontally on a weight-bearing surface, while the web of the I-joist is arranged so that its width is positioned vertically therebetween. Typical I-joists can be up to 60 feet long, up to 24 inches tall, and down to 1.75 inches wide, but some configurations may have a shorter or longer length, a shorter or taller height, or a wider or narrower width. Some constructions of I-joists have a web thickness of 0.375 inches, others are of approximately 0.719 inches, however, other constructions are possible. Typical I-joists, may have exposed webbing of about 8-16 inches.

I-joists add strength relative to dimensional wood joists and generally weigh less. A reason for the added strength and reduced weight of I-joists is due to the web being constructed of oriented strand board ("OSB"). Oriented strand board is a type of engineered wood particle board formed from compressed layers of wood strands and adhesives. A problem with I-joists is that OSB burns quickly and, if damaged by fire, can weaken the structural integrity of a building. This can place fire fighters at risk of injury and death from collapse of fire-damaged floors and roofs built with I-joists. As such, there exists a need in the art for ways of overcoming the drawbacks of using I-joists without negating the strengths of I-joists.

SUMMARY OF INVENTION

In various examples and embodiments, a construction material or a part of a construction material (for example, the exposed webbing of an I-joist) may be coated with a fire-resistant cementitious material or slurry. The construction material may be coated using a flow coater. In some embodiments, the construction material may be coated using a flow coater, a curtain coater, a sprayer, or other apparatus for delivering the fire-resistant cementitious material to the construction material. The first side may be coated with a wetting layer of the cementitious material, the wetting layer may be allowed to flow and level out for a time, and then the first side may be coated again with a second layer of the fire-resistant cementitious material or with a combination of the cementitious material and a filler such as fiberglass. The coating(s) may then be subjected to a curing treatment, and optionally additional curing or drying, followed by coating the second side of the construction material using a similar methodology followed by a curing treatment and optional additional curing or drying. By applying one or more coatings on each side of the construction material, a fire barrier layer may be produced that provides advantageous fire-resistant properties to the building material.

In more specific examples and embodiments, methods involve coating an I-joist with fire-resistant cementitious material or slurry using a flow coater, a curtain coater, or a sprayer. The cementitious material may be deposited on a web of the I-joist in such a manner that the cementitious material flows and evens out atop the web without requiring additional treatment steps, e.g., without the need for spreading the cementitious material across the web, prior to initiating curing of the cementitious material. For instance, using flow coating to deposit the cementitious material onto the web, a line pressure may be about 3 to 18 psi or about 5 to 10 psi may result in delivering the cementitious material to the web without atomization and enables the deposited layer to naturally flow and even out across the web over a settling period of about 3 to about 7 seconds. In another example, using spray coating to deposit the cementitious material onto the web, a line pressure of about 20 to about 45 psi and a distance between the nozzle(s) and the web of about 12 to 18 inches may enable the deposited layer to naturally flow and even out across the web over a settling period of about 3 to about 7 seconds. These approaches may provide efficiencies to producing fire resistant I-joists because the deposited layer(s) may naturally settle over a short period of time, which enables the coated I-joist to quickly transition to down line processing steps, e.g., additional coating and/or curing. Such coating processes may therefore be used in automated or semi-automated production facilities.

In some embodiments, a method for coating an I-joist with a fire resistant coating involves conveying an I-joist past a first delivery unit comprising at least one delivery orifice; delivering a first coating of a cementitious material on a first side of a web of the I-joist using the delivery orifice; curing the first coating, wherein the I-joist is conveyed so that a time between depositing the first coating on a portion of the web and curing the first coating is sufficient for the first coating to flow and even out; rotating the I-joist to expose a second side of the web of the I-joist; conveying the I-joist past the first delivery unit such that the second side of the web faces the nozzles; delivering a second coating of a cementitious material on the second side of the web using the delivery orifice; and curing the second coating, wherein the I-joist is conveyed so that a time between depositing the second coating on a portion of the web and curing the second coating is sufficient for the first coating to flow and even out.

In some embodiments, a method for coating an I-joist with a fire resistant coating may comprise the steps of: conveying an I-joist past a first delivery unit and a second delivery unit such that a first side of a web of the I-joist faces the delivery units; coating the first side of a web of the I-joist with a first coating of a cementitious material, the first coating delivered from the first delivery unit; spraying a second coating on the wetted first side of the web, the second coating comprising a mixture of cementitious material delivered from a nozzle of the second delivery unit; and curing the first and second coatings. The I-joist may be conveyed so that a time between depositing the first coating on a portion of the web and depositing the second coating on the same portion of the web is sufficient for the first coating to flow and even out.

In some embodiments, a method of applying a fire resistant material to a building material having an imperfection and a substrate may comprise the steps of: receiving the building material; applying a first coating of the fire resistant material to the substrate; waiting until the first coating has settled into the imperfection; applying a fiberglass filler to the substrate after the first coating has settled into the imperfection; applying a second coating of the fire resistant material to the substrate over the applied fiberglass filler; and curing the substrate.

In some embodiments, a method for coating an I-joist with a fire resistant coating may comprise the step of conveying a substantially horizontal I-joist past a first delivery unit comprising at least one nozzle and a second delivery unit comprising at least one nozzle such that a first side of a web of the I-joist faces the nozzles. The method may also comprise wetting the first side of a web of the I-joist with a first coating of a cementitious material, the first coating delivered from the first delivery unit; and spraying a second coating on the wetted first side of the web, the second coating comprising a mixture of cementitious material and a filler and delivered from the second delivery unit. The I-joist may be conveyed so that a time between depositing the first coating on a portion of the web and depositing the second coating on the same portion of the web is sufficient for the first coating to flow and even out. The method may also comprise curing the first and second coatings; rotating the I-joist; conveying the substantially horizontal I-joist past the first and second delivery units such that a second side of the web of the I-joist faces the nozzles; wetting the second side of a web of the I-joist with a third coating of a cementitious material, the third coating delivered from the first delivery unit; spraying a fourth coating on the wetted second side of the web, the fourth coating comprising a mixture of cementitious material and a filler and delivered from the second delivery unit; and curing the third and fourth coatings. The I-joist may be conveyed so that a time between depositing the third coating on a portion of the web and depositing the fourth coating on the same portion of the web is sufficient for the first coating to flow and even out.

In some embodiments, a method of applying a fire resistant material may comprise the steps of: receiving a building material having a set of characteristics and a substrate; determining a particular spacing distance, a particular settling period, a first particular spray characteristic, and a second particular spray characteristic based on the set of characteristics; positioning a first spray nozzle so it is the particular spray distance away from a second spray nozzle; applying a first fire resistant material spray from the first spray nozzle to the substrate, the first fire resistant material spray having the first particular spray characteristics; allowing the deposited material to settle for the particular settling period; applying a second fire resistant material spray from the second spray nozzle to the substrate, the second resistant material spray having the second particular spray characteristics; and curing the substrate.

In some embodiments, a method of applying a fire resistant material to a building material having an imperfection and a substrate may comprise steps of: receiving the building material; applying a first coating of the fire resistant material to the substrate; waiting until the first coating has substantially settled into the imperfection; applying a second coating of the fire resistant material to the substrate; and curing the substrate.

DETAILED DESCRIPTION OF EXEMPLARY EMBODIMENTS

Overview:

For purposes of the present discussion, the term "fire-resistant" encompasses any type of fire barrier substance, such as fire retardants, flame retardants and flame-resistant materials that can be prepared in the form of a slurry or cementitious material; and the terms "impregnate" and "coat" encompasses any degree, level, or amount of intake of cementitious material into a porous carrier material, such as saturation, dispersion with some entrained air or surface coating.

Cementitious materials that provide fire barrier protection and may be used to coat substrates, according to embodiments disclosed herein, may include fire-resistant coatings such as Pyrotite® and other similar substances, such as magnesium oxychloride and/or magnesium oxysulphate or the like with or without filler. Pyrotite® is a fire-resistant magnesium oxychloride material with filler such as inert sand, gravels, crushed rocks, silica flour, pumice, vermiculite, volcanic ash, perlite, wood shavings, and/or mineral fibers. Specific chemistries of fire-resistant materials that provide fire protection, which may be used in accordance with the systems, methods and products disclosed herein, are described in U.S. Pat. Nos. 4,572,862; 4,818,595; and 5,039,454, which are hereby incorporated by specific reference in their entireties for all purposes. Typical fire-resistant coatings contain 3-7 molar magnesium oxychloride, are 10-125 mils thick, and include filler. A fire-resistant mixture may have a viscosity of about 200 centipoise (cp) to about 1,000 cp or preferably about 200 cp to about 300 cp. The viscosity may change over time and with the conditions to which the mixture is subjected. The thickness of the coating on the substrate varies according to the level of fire resistance desired for a particular application, and the filler in the material varies depending on desired handling qualities during manufacturing and resulting product characteristics. Substrates that may be coated with fire-resistant materials may include, for example, wood, plywood, OSB, plastic, metals, wallboard, medium density fiberboard (MDF), and particle board, or any material or composite material suitable for coating. Typical substrates may take the form of a planar sheet, such as a web 120, but smaller and/or larger substrates are also equally possible.

Figure 1B:
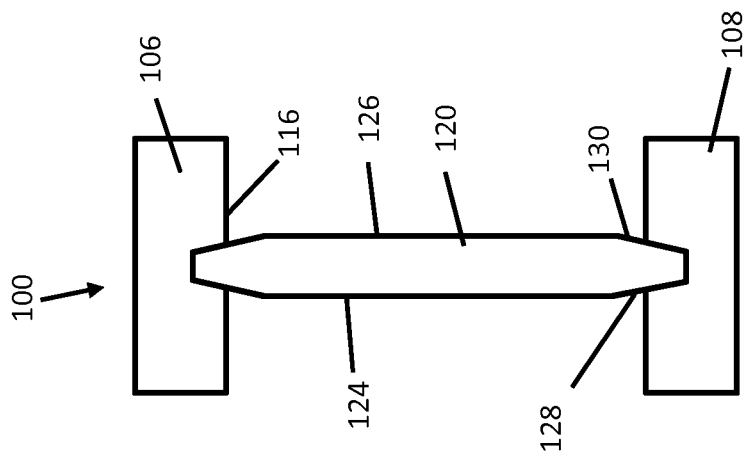
FIG. 1B is an end view of an I-joist.
Figure 1A:
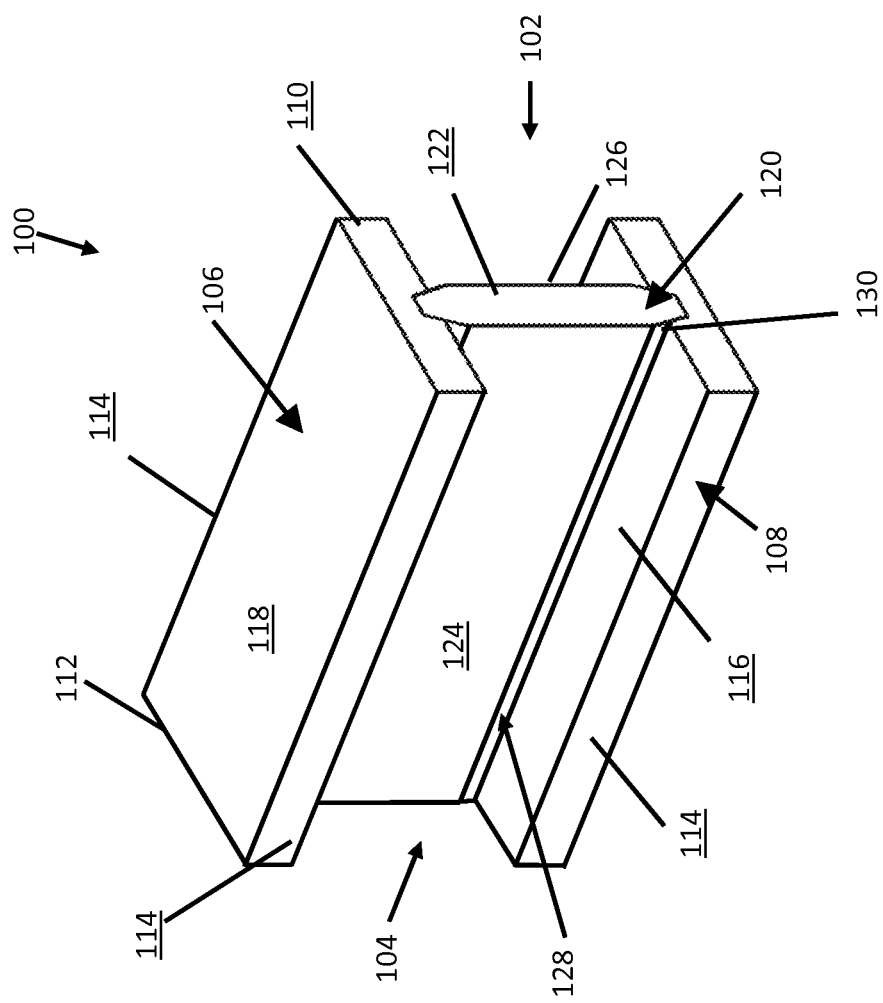
FIG. 1A is an isometric view of an I-joist.

FIG. 1A is an isometric view of an I-joist 100. As illustrated in FIG. 1A, the I-joist 100 may comprise a first end 102, a second end 104, a first flange 106, a second flange 108, a first flange end wall 110, a second flange end wall 112, a lateral wall 114, an inner wall 116, an outer wall 118, a web 120, a web end wall 122, a platen side 124, a screen side 126, valley regions 128 and beveled edges 130. The locations of these areas can be used to reference various general regions of the I-joist 100. For example, one of the platen or screen sides 124, 126 may be referred to as a first or second side and may include the lateral or even inner walls 114, 116 of the corresponding side. Depending on the orientation of the I-joist, these regions may be referred to as a top or bottom side. Alternatively, the first flange 106 or even just the outer wall 118 of the first flange 106 may be referred to as a top side with the second flange 108 or its outer wall 118 being referred to as a bottom side, or vice versa. The first end 102 may be defined by the region including the first flange end walls 110 of the first and second flanges 106, 108 and a web end wall 122. The second end 104 of the I-joist 100 may be similarly defined with respect to the second flange end walls 112 and corresponding web end wall 122. However, the terms front, back, left, right, top, bottom, side, base, and other descriptors can be used to define various other regions of the I-joist 100 and may depend on the orientation of the I-joist 100, the position from which the I-joist 100 is viewed, or a preferred word choice.

FIG. 1B is an end view of the I-joist 100. The I-joist 100 has three main components the first flange 106, the second flange 108, and the web 120. In some manufacturing processes, the web 120 may be produced using a screen and platen method, which can result in the relatively smooth platen side 124 and the relatively rough screen side 126. As a result of the manufacturing process, the beveled edges 130 may be formed where the edges of the web 120 meet a respective flange. The beveled edges 130 may define the valley region 128. Depending on the manufacturing process used to produce the I-joist 100, the beveled edges 130 may be a location of structural weakness of the I-joist 100. The valley region 128 may be a difficult-to-reach area for materials (e.g., a cementitious material) applied to the I-joist 100 and may cause gaps in protection offered by the materials. Some disclosed embodiments may address the effects of the beveled edges 130 and valley regions 128. For example, the filling of the valley regions 128 with cementitious material may increase the strength of the I-joist 100.

Figure 2:
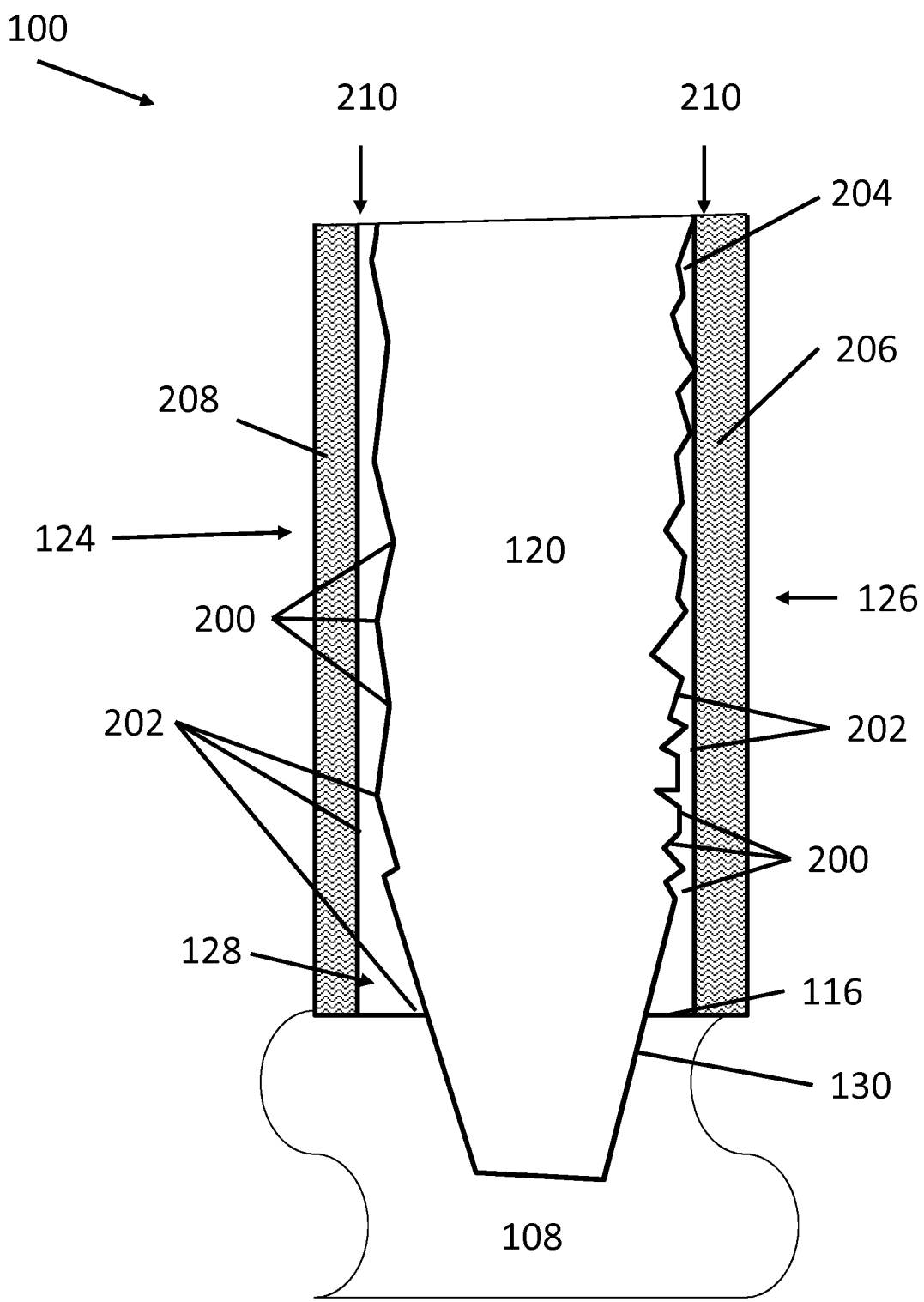
FIG. 2 is an enlarged cross-sectional view of an I-joist with first and second cementitious layers applied.

FIG. 2 shows an enlarged end view of the I-joist 100 after being treated according to one embodiment. In this enlarged view, imperfections 200 in the I-joist 100 are visible. Substrates 202 are also shown. A substrate 202 may be a surface on which a material is disposed or a target of a process. For example, the substrate may include portions of a flange, the imperfections 200, a first cementitious layer 204, and a second cementitious layer 206. In particular, the first cementitious layer 204 may be disposed on the imperfections 200, the second cementitious layer 206 may be disposed on the first cementitious layer 206, and fiberglass 208 may be disposed on the second cementitious layer 206. According to certain implementations, the first and second cementitious layers 204, 206 may be formed from a cementitious material 210. The cementitious material 210 may be arranged on both sides of I-joist 100, the cementitious material 210 having been deposited in first and second cementitious layers 204, 206 as described herein. The first layer 204 of cementitious material 210 fills the valley regions 128 defined by the beveled edge 130 and the adjoining inner walls 116 of a flange and fills imperfections 200 present on the first and second sides of the web 120. In some implementations, the cementitious material 210 filling the valley regions 128 and imperfections 200 may be provided as a first layer or coating and may be referred to as a wetting layer or a first cementitious layer 204. In addition, a thickening layer of cementitious material 210 and optionally fiberglass 208 and/or a filler may be disposed over the first layer 204 and may be referred to as a second cementitious layer 206. In some embodiments this second cementitious layer 206 or even subsequent layers or materials can be used to completely fill in the imperfections 200 or valley regions 128. In some embodiments, the total thickness of the deposited cementitious layer or layers on each side of the I-joist 100 may be in the range of 0.08-0.2 inches; however, other embodiments may have differing ranges of thickness depending on desired characteristics. For example, a thicker cementitious layer or layers provides increased fire resistance and/or increased strength of the I-joist 100. The exact thickness of the web 120 and/or cementitious layers may vary in relation to each other to achieve a desired combination of fire resistance, structural strength, and cost. In some alternative embodiments, the first cementitious layer 204 may serve to fill the imperfections 200 and serve as a thickening agent, thus making the second cementitious layer 206 optional.

Figure 3:
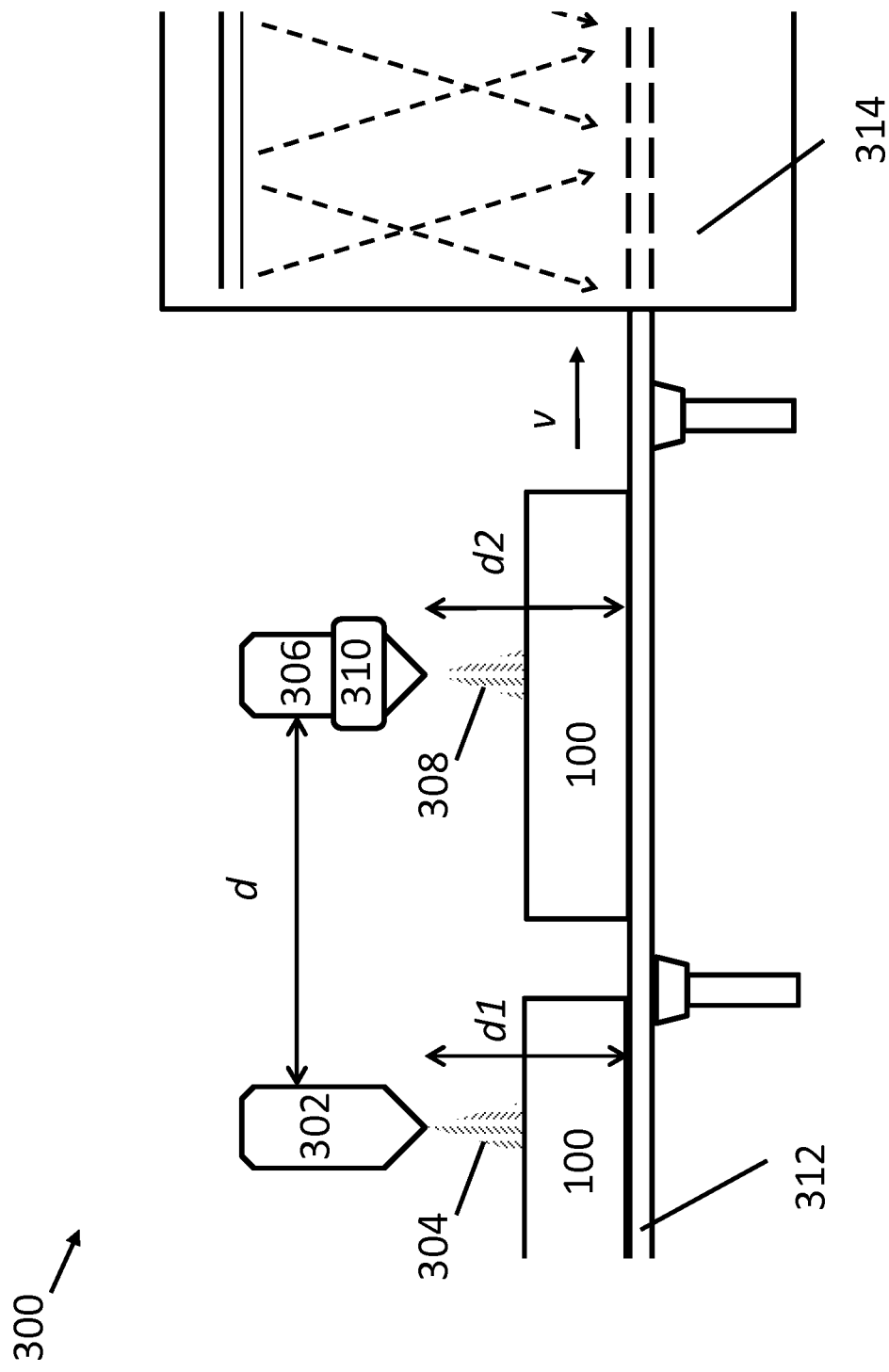
FIG. 3 is a side view of a production line that may be implemented according to disclosed embodiments.

Systems for Treating I-Joists:

FIG. 3 is a side view of an embodiment of a treatment system 300. The treatment system 300 may include a first delivery unit 302 for applying a first application 304 of a cementitious material 210, a second delivery unit 306 for applying a second application 308 of a cementitious material (the composition of the cementitious material may be the same as or different from the first application 304), a fiberglass delivery unit 310, a conveyer 312, and a curing station 314. Although components of the system 300 are shown separately and in combination, it will be understood that the components may be provided in any order, whether separately or in combination. An I-joist 100 may be transported through the system 300 at a constant line speed v using the conveyer 312. The conveyer 312 may be a powered or passive system or combination of systems for moving the I-joist 100 through the treatment system 300 including, but not limited to, conveyer belts, lineshaft rollers, grabbers, pushers, pullers, or other transportation systems. In some embodiments, the conveyer 312 or a portion of the conveyer 312 may substantially lock the I-joist 100 in place in order to, for instance, resist slippage of the I-joist 100 as it travels through the treatment system 300. Although the conveyer 312 is shown as being continuous and linear, in other embodiments the conveyer 312 may include different sections, some of which may be arcuate or positioned laterally. In some implementations, the I-joist is conveyed at a constant rate of speed past the first delivery unit 302 and the second delivery unit 306. However, the configuration of these sections may result in changing the way in which the I-joist 100 moves through the treatment system 300. For example, one section of the conveyer 312 may move the I-joist 100 at a slower line speed v than other sections. For instance, the line speed v may be between 30-100 feet per minute (0.5-1.67 feet per second); however, other configurations may have different line speeds v. The configuration of the conveyer 312 may result in the I-joist 100 spending different amounts of time in different sections.

While being transported by the conveyer 312, the I-joist 100 travels past the first delivery unit 302. The first delivery unit 302 is located a distance dl away from the conveyer 312 such that the first delivery unit 302 may coat a substrate of the I-joist 100 with a first layer of cementitious material 210 via the first application 304. The second delivery unit 306 may be located a distance d2 away from the conveyer 312 such that the second delivery unit 306 may coat the substrate 202 of the I-joist 100 with a second cementitious layer via the second application 308. In addition, the second delivery unit 306 may be located at a spacing d away from the first delivery unit 302. For example, spacing d may be in the range of 3-6 feet. In one embodiment of the treatment system 300, spacing d may be easily adjustable by moving one or both of the first and second delivery units 302, 306. The amount that spacing d is increased or decreased may depend on various factors including line speed v and desired time between treatments by first application 304 and second application 308. In other embodiments of the treatment system 300, the spacing d may be substantially fixed and the desired time between treatments may be varied by increasing or decreasing the line speed v.

In some alternative embodiments, a single delivery unit may be spaced relative to the curing station 314. For example, the delivery unit may be located a spacing d away from the curing station 314. The spacing d may be adjustable by moving one or both of the delivery unit and the curing station 314. In other embodiments of the treatment system 300, the spacing d may be substantially fixed and the desired time between treatments may be varied by increasing or decreasing the line speed v. In some embodiments, the first and second delivery units 302, 306 may be movable. In such embodiments, in addition to or instead of conveying an I-joist 100 past the delivery units 302, 306 using the conveyer 312 during the first and second applications 304, 308, the first and second delivery units 302, 306 may be moved past the I-joist 100 to dispose the cementitious material 210.

The first delivery unit 302 and/or the second delivery unit 306 may include an application nozzle and/or tube or a combination of application nozzles and/or tubes configured to deposit cementitious material 210 on the substrate 202 of I-joist 100. For example, one embodiment may have three different application nozzles: one directed toward each valley region 128, beveled edge 130, and/or inner wall 116 of the I-joist 100 and another directed toward the web 120. Depending on the viscosity, temperature, specific gravity, and/or surface tension of the cementitious material 210 deposited, different modes of deposition and therefore different configurations of the delivery units may be needed. For example, in some embodiments, the diameter of a nozzle may be between about 0.060 inches and about 0.080 inches, but larger or smaller sizes may be used. The nozzle may take a variety of configurations in order to suitably apply the cementitious material 210, including plain-orifice nozzle, shaped-orifice nozzle, surface-impingement nozzle, pressure-swirl spray nozzle, solid-cone nozzle, compound nozzle, ultrasonic nozzle, electrostatic nozzle, air induction nozzle, pre-orifice nozzle, curtain coating nozzle and/or other nozzles as needed to apply the cementitious material 210 to the substrate in a useful manner.

While traveling through the treatment system 300, a fiberglass delivery unit 310 may apply fiberglass 208 or other filler to the I-joist 100. The fiberglass delivery unit 310 may be located in the treatment system to apply fiberglass 208 before, during, or after the first and/or the second application 304, 308. For instance, the fiberglass delivery unit 310 may be positioned between the first and the second delivery unit 302, 306, or down line from the second delivery unit 306.

After a first and/or second cementitious layer 204, 206 has been applied to the I-joist 100, the I-joist 100 may enter the curing station 314. The curing station 314 may initiate a curing process of the cementitious material 210. Curing may proceed in a variety of ways including one or more of the following: altering the ambient conditions of the curing station 314 to affect the I-joist 100, applying energy to the I-joist 100, and/or applying a substance to the I-joist 100. Altering the ambient conditions may include altering the temperature, humidity, and/or air flow present within curing station 314. Applying energy to the I-joist 100 may include applying radiation from the electromagnetic spectrum such as ultraviolet or infrared radiation, for instance, using various lamps or emitters. In some embodiments, heat may be generated from gas- or electrically-powered sources; however, other sources or methods may be used as appropriate. Applying energy may also include applying electricity to the I-joist 100 or running the I-joist 100 near a magnetic source. Applying a substance to the I-joist 100 may include providing a liquid spray or a gaseous cloud in order to deliver a substance to the surface of the I-joist 100 to assist in curing. Depending on the curing method, the curing station 314 may be configured with vents, shields, fans, isolation means, flaps, and/or doors. In some embodiments, the entirety of the I-joist 100 is cured at once, while in others, only a portion is cured at a given time.

After traveling through the curing station 314, the I-joist 100 may be taken to other treatment areas or directly to curing racks for further curing, drying, and/or waiting. These additional areas may include warehouses, stacking areas, transportation zones, cleaning apparatuses, inspection devices, labeling devices, and/or other post-treatment areas. A conveyer 312 may continuously transfer the I-joist 100 to these other areas or the I-joist 100 may be moved to different conveyers or other transportation methods. The processes may facilitate providing a fire-resistant coating that retains an amount of water to provide fire-resistant properties and may additionally provide some flexibility to the cementitious layers due to the hydrated nature of the layers.

Figure 4:
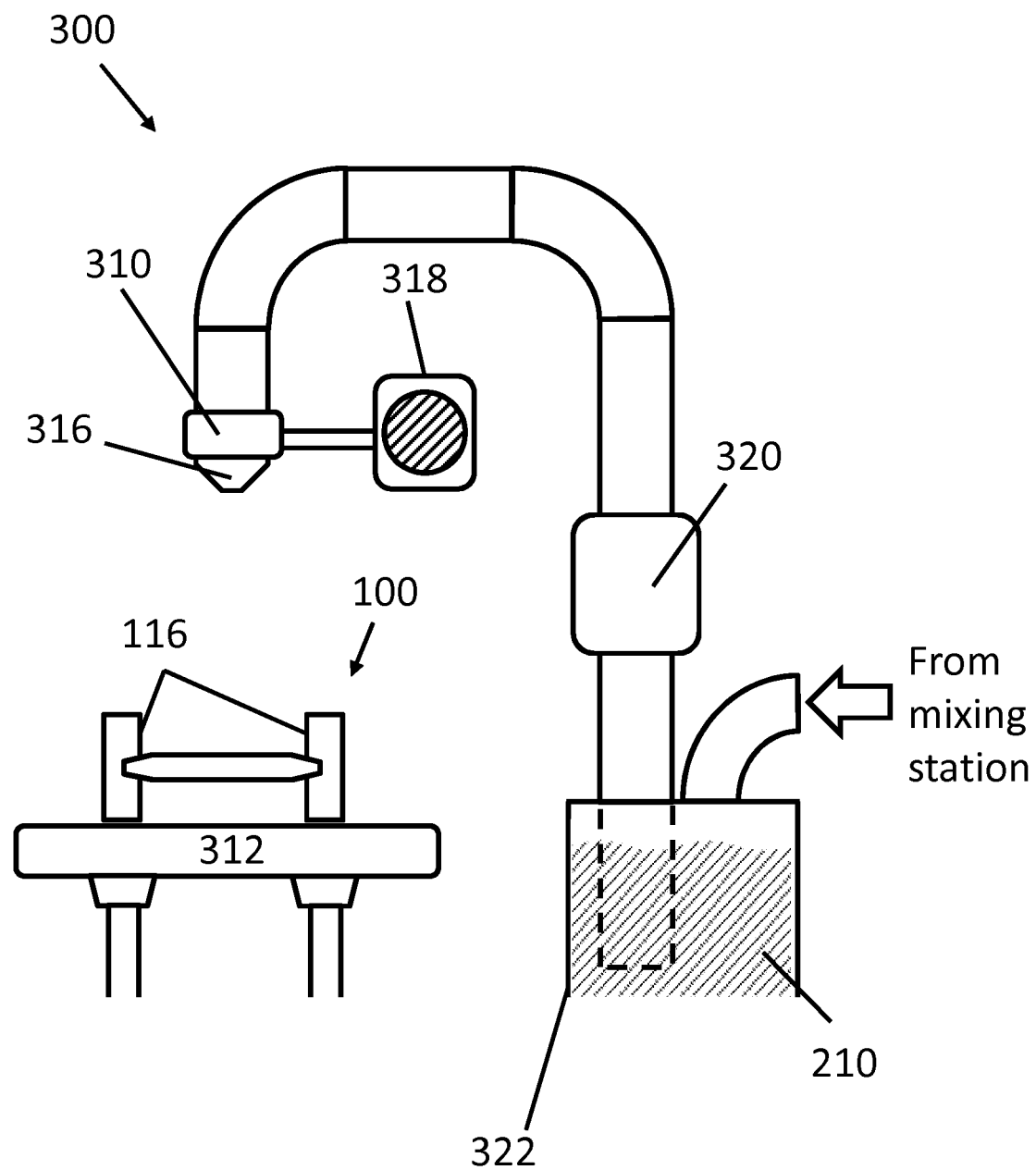
FIG. 4 is a front view of a production line that may be implemented according to disclosed embodiments.

FIG. 4 shows an end view of the treatment system 300, illustrating the source of the material for the second delivery unit 306 and fiberglass delivery unit 310, including a nozzle 316, a fiberglass source 318, a pump 320, and a material batch tank 322. The first delivery unit 302 may be similarly constructed and/or the fiberglass delivery unit 310 may be omitted. The second delivery unit 306 can be constructed of various components including an accumulator and the nozzle 316. Embodiments where fiberglass or other filler is applied may also include the fiberglass source 318 and the fiberglass delivery unit 310. The accumulator may be used to provide pressure to produce a second application 308 and may also be used to achieve a consistent pressure such that a uniform flow is produced. This may be especially useful when the I-joist 100 is moved at high speeds. The accumulator may be of any type of pressure producing system including but not limited to bladder accumulators, diaphragm accumulators, piston accumulators, pumps, and other pressure introducing systems.

The fiberglass source 318 is a unit that provides fiberglass for the fiberglass delivery unit 310. The fiberglass source 318 may be, for example, a roll of gun roving for chopping by fiberglass delivery unit 310. In other embodiments, the fiberglass source 318 may be a hopper filled with pre-chopped fiberglass, or a source of woven roving or fiberglass cloth. The fiberglass delivery unit 310 is a device that takes fiberglass from the fiberglass source 318 and prepares it for application to the I-joist 100. In an embodiment, the fiberglass delivery unit 310 may take the form of a device that cuts fiberglass strands received from the fiberglass source 318 into small pieces for disposition onto the substrate 202 such as a chopping wheel comprising a rubber wheel with razor blades pressured against it to cut a fiberglass strand so the fiberglass 208 can be embedded on the substrate 202. In other embodiments, the fiberglass delivery unit 310 may be a blower for applying pre-chopped fiberglass or a roller for applying mats of fiberglass. In still other embodiments, the fiberglass delivery unit 310 is configured as a hopper to deliver pre-cut fiberglass.

The fiberglass delivery unit 310 and the second delivery unit 306 may be configured such that the fiberglass delivery unit 310 delivers strands of fiberglass 208 within substantially the same time or space as the delivery of the cementitious material 210. This may be accomplished by, for example, mixing the cementitious material 210 and the fiberglass 208 strands prior to delivering the second application 308. In some embodiments, the mixing of the cementitious material 210 and the fiberglass 208 strands may occur after the cementitious material 210 leaves the second delivery unit 306. For example, the fiberglass 208 may be blown onto the spray after the spray leaves the nozzle so the spray carries the fiberglass 208 to the substrate 202. Alternative embodiments may deliver the cementitious material 210 and the fiberglass 208 strands separately. Depending on the delivery method chosen, additional components may be provided such as sprayers, blowers, nozzles, tubes, and other delivery components.

The nozzle 316 may be used to deliver a mixture of the fiberglass 208 strands and cementitious material 210 or the nozzle 316 may deliver the cementitious material 210 alone. The cementitious material 210 may arrive at a nozzle 316 through a tube connecting the nozzle 316 to the pump 320 which draws the cementitious material 210 through the tube from a material batch tank 322. The cementitious material 210 may arrive at the material batch tank 322 through another tube from a mixing station.

In some embodiments, the material batch tank 322 may be configured to prepare the cementitious material 210 for subsequent application to the I-joist 100. This may include heating or cooling elements to maintain the cementitious material 210 at a suitable temperature for application or to prevent premature curing. The material batch tank 322 may also include mixing arms, shakers, or other devices to ensure the cementitious material 210 remains in a suitable state for application. In other embodiments, catalysts or other solutions may be added to the cementitious material 210 in the material batch tank 322 to prepare the cementitious material 210 for application or curing. The material batch tank 322 may be of various sizes depending on desired characteristics of the system 300. For example, in one embodiment, the size of the material batch tank 322 may be between about 60 to about 75 gallons, however, other sizes are possible. In one embodiment, the material batch tank 322 may be replenished with a fresh batch of mixture over about 10 to about 12 minutes. For example, the system 300 may deliver about 60 to about 75 gallons every about 10 to about 12 minutes. This rate of replenishment may mean that in some embodiments, the same batch of the mixture is not applied to both sides of the I-joist 100 and potentially that the same batch of the mixture is not applied to different portions of the same side of the I-joist 100. In alternative implementations, the cementitious material may be prepared through in-line mixing, which may enable the system 300 to deliver cementitious material on demand.

In some embodiments a pump 320 may assist in drawing the cementitious material 210 from the material batch tank 322. The pump 320 may also be the source of the pressure that may be used in delivering the second application 308, may cooperate with the accumulator to provide sufficient pressure to deliver the second application 308 with desired characteristics, or the pump 320 may play no part in producing the pressure for use in delivering the second application 308.

Figure 5:
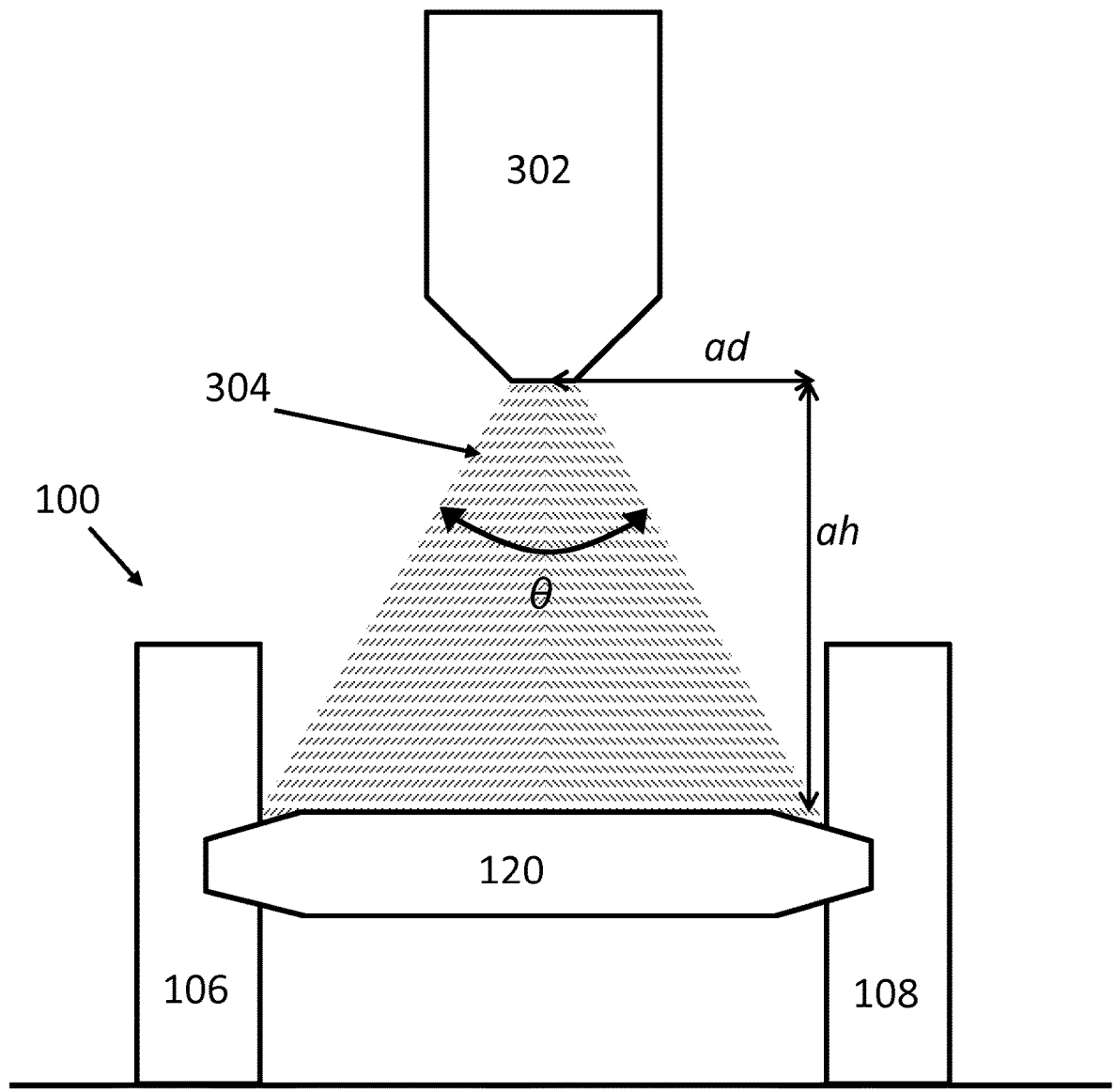
FIG. 5 is a front view of an I-joist and a spray nozzle delivery unit.

FIG. 5 is a detailed view of the first delivery unit 302; however, the second delivery unit 306 may have similar characteristics. Characteristics of the first application 304 are illustrated, including an application distance ad, an application height ah and an application angle θ. The application characteristics may vary depending on the desired substrate 202. In some situations, it may be desirable to apply the first application 304 only to the exposed web 120. For example, the I-joists 100 may have an exposed web 120 of 16 inches between the flanges 106, 108. In this situation, the application 304 can be adjusted to have an application distance ad that will allow a flow and spread to match the open web 120 distance. It may also be desirable to apply the first application 304, the second application 308, the fiberglass 208, or a combination thereof to a portion of the flanges 106, 108. For example, the application distance ad may be greater than the exposed web such that the application coats a portion of the inner wall 116 or even a portion of the lateral wall 114. However, overspray of the intended substrate may result in waste of materials, while underspray may result in inadequate coverage of the substrate by the cementitious material 210. The characteristics of the application, including pressure, may be used to control overspray and underspray of the cementitious material. Shields or barriers may be used to prevent the cementitious material from being applied to an undesirable location, but alternatively, the system may be free of shields or barriers proximate the delivery unit(s). Additionally, the pressure used to form the first application 304 may vary depending on different characteristics such as the line speed v, the application distance ad, the application height ah, and the application angle θ. In one embodiment, the pressure may be between about 40 psi and 80 psi. In other embodiments, the pressure may be between about 80 psi and about 120 psi. In some embodiments, the pressure may be between 25 psi and 80 psi. The application height ah and pressure may also be varied in order to change the impact speed of the cementitious material 210 on the I-joist 100.

In some embodiments, the application may cause the disposed cementitious material 210 to form a U-shape on the I-joist 100, such that there may be relatively more cementitious material 210 in some outer regions and relatively less cementitious material 210 in a middle region. For example, for certain application configurations, there may be a relatively thicker amount of the cementitious material 210 built up against the inner wall 116 and a relatively lower amount of the cementitious material 210 in a middle portion of the web 120. In some embodiments and for some I-joists 100, this U-shaped configuration of the cementitious material 210 may be desirable as it may reinforce the I-joist and provide additional strength. For example, in some embodiments, the system may be configured to deposit a relatively larger amount of cementitious material 210 where the web 120 meets the flanges 106, 108 and may fill in the valley region 128. The additional cementitious material 210 may increase the strength of the I-joist 100 in these areas and contribute to an overall increase in the strength of the I-joist. In other situations, the U-shaped application of the cementitious material 210 may result in too little material deposited in a region (e.g., the middle of the web 120) and more material than necessary in another region. The application pressure and other application parameters may be selected encourage or discourage the formation a U-shaped cementitious layer on the I-joist 100. Parameters may also be selected to encourage the formation of U-shaped cementitious layer having particular characteristics, such as a minimum or maximum thickness in certain areas. Some systems may include elements configured to form or remove the U-shape (or other shapes) from the applied materials. Elements may include, but need not be limited to smoothers, rollers, guides, air blowers, or other elements. Some elements may form the U-shape cementitious layer without the need for positive shaping or forming elements; for instance, the application of the cementitious material alone may be sufficient to create the U-shape. For instance, spray coating the cementitious material 210 over the web 120 at a line pressure of about 20 to about 45 psi and a distance between the nozzle(s) and the web of about 12 to 18 inches may facilitate formation of a U-shaped coating over the web without the need for shaping elements. In this example, the cementitious material 210 may be applied with or without fiberglass.

In some embodiments, there may be a minimum and a maximum target volume per area of web for the application of the cementitious material 210 to the web of an I-joist. The unit applying the cementitious material 210 may be configured to apply the cementitious material 210 such that at least the minimum target amount is applied and no more than the maximum is applied. The minimum and maximum amounts may vary across the length and/or the width of the web. For example, a middle of the web away from the flanges may have a smaller minimum and maximum than an outer portion of the web closer to the flanges. The minimum and maximum values may be selected using desired strength characteristics of the I-joist, minimum effective amounts of the cementitious material 210, resulting weight of the I-joist when an amount of cementitious material 210 is applied, and other characteristics.

Figure 6:
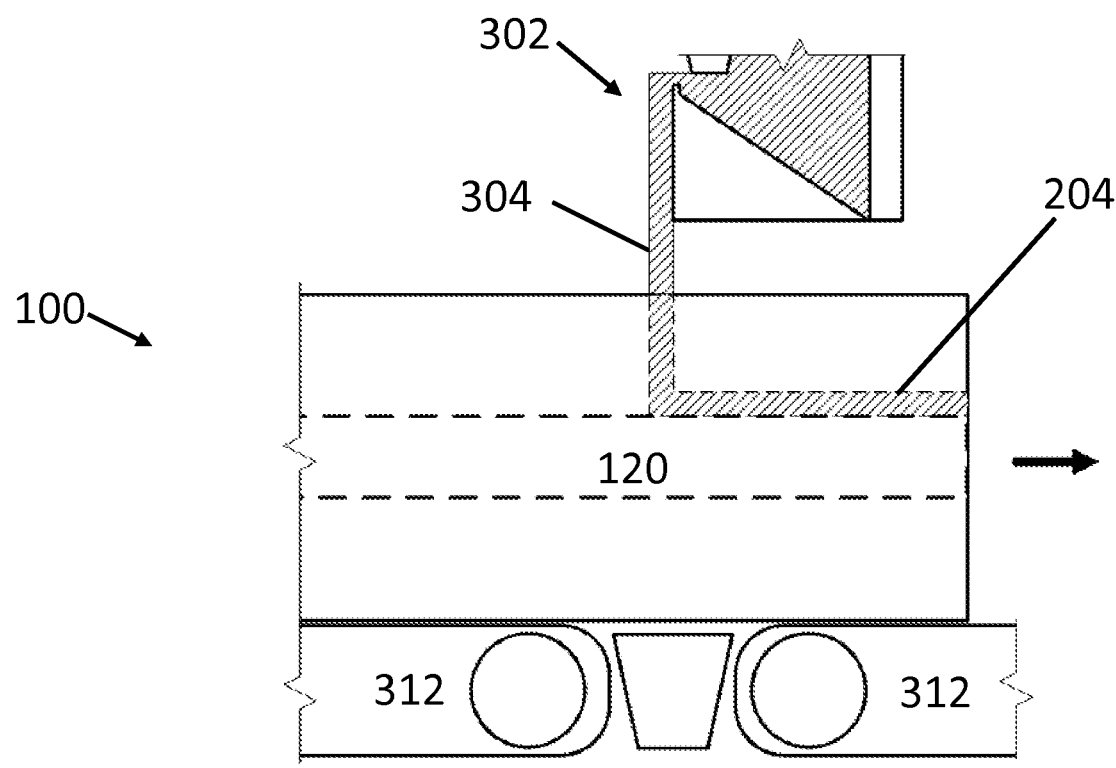
FIG. 6 is a side view of a delivery unit delivering a first application of a curtain of cementitious material to a web of an I-joist.

FIG. 6 illustrates a side view of a delivery unit 302 delivering a first application 304 of a curtain of cementitious material 210 to a web 120 of an I-joist 100. In particular, a conveyer 312 delivers the I-joist 100 through a curtain of cementitious material 210, which deposits the cementitious material 210 in a first cementitious layer 204 on the web 120. The thickness of the curtain and/or the speed of the conveyer 312 may be varied depending on a desired amount of cementitious material 210 to be deposited on the web of the I-joist 100. In some embodiments, the width of the curtain may be selected to minimize the amount of cementitious material 210 deposited on the tops of the flanges of the I-joist 100 (e.g., the width of the first application 304 is less than or equal to the width of the exposed web 120). In some embodiments, the width may be selected to deposit an amount of cementitious material on the tops of the flanges of the I-joist 100 (e.g., the width of the first application 304 is greater than the width of the exposed web 120). While the delivery unit 302 is shown as providing a first application 304, this configuration need not, or need not only be used to apply the first application 304.

Figure 7:
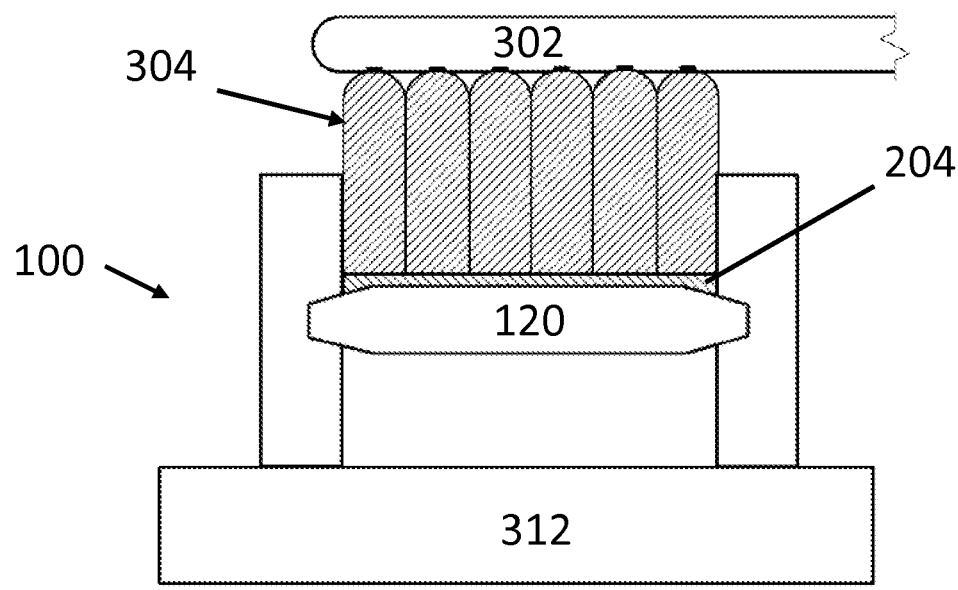
FIG. 7 is a front view of a delivery unit delivering a first application of a flow coating of cementitious material to a web of an I-joist.

FIG. 7 illustrates a front view of a delivery unit 302 delivering a first application 304 of a flow coating of cementitious material 210 to a web 120 of an I-joist 100. In particular, a conveyer 312 delivers the I-joist 100 through the flow of a first application 304 of cementitious material 210, which deposits the cementitious material 210 in a first cementitious layer 304 on the web 120. The volume of cementitious material 210 deposited on the web may be controlled by varying the volume of the first application 304, the speed of the conveyer 312, and/or other parameters. As illustrated, the total width of the first application 304 is set so the cementitious material 210 is not deposited on the top of the I-joist 100; however, the total width of the first application 304 may be controlled to apply cementitious material 210 on the top of the I-joist 100. The delivery unit 302 may provide the first application 304 via several orifices. The orifices may have various shapes and/or sizes to control the properties of the first application 304. For example, the orifice may have an elongate shape, a square shape, a curved shape, a crescent shape, or other shapes. In some embodiments, the delivery unit 302 may deliver the first application 304 as a flow coating in a fan-like or other pattern. The delivery unit 302 may be configured to deliver the pattern without atomizing or without substantially atomizing the cementitious material 210 as it leaves the orifice. While the delivery unit 302 is shown as providing a first application 304, this configuration need not, or need not only be used to apply the first application 304.

Figure 8:
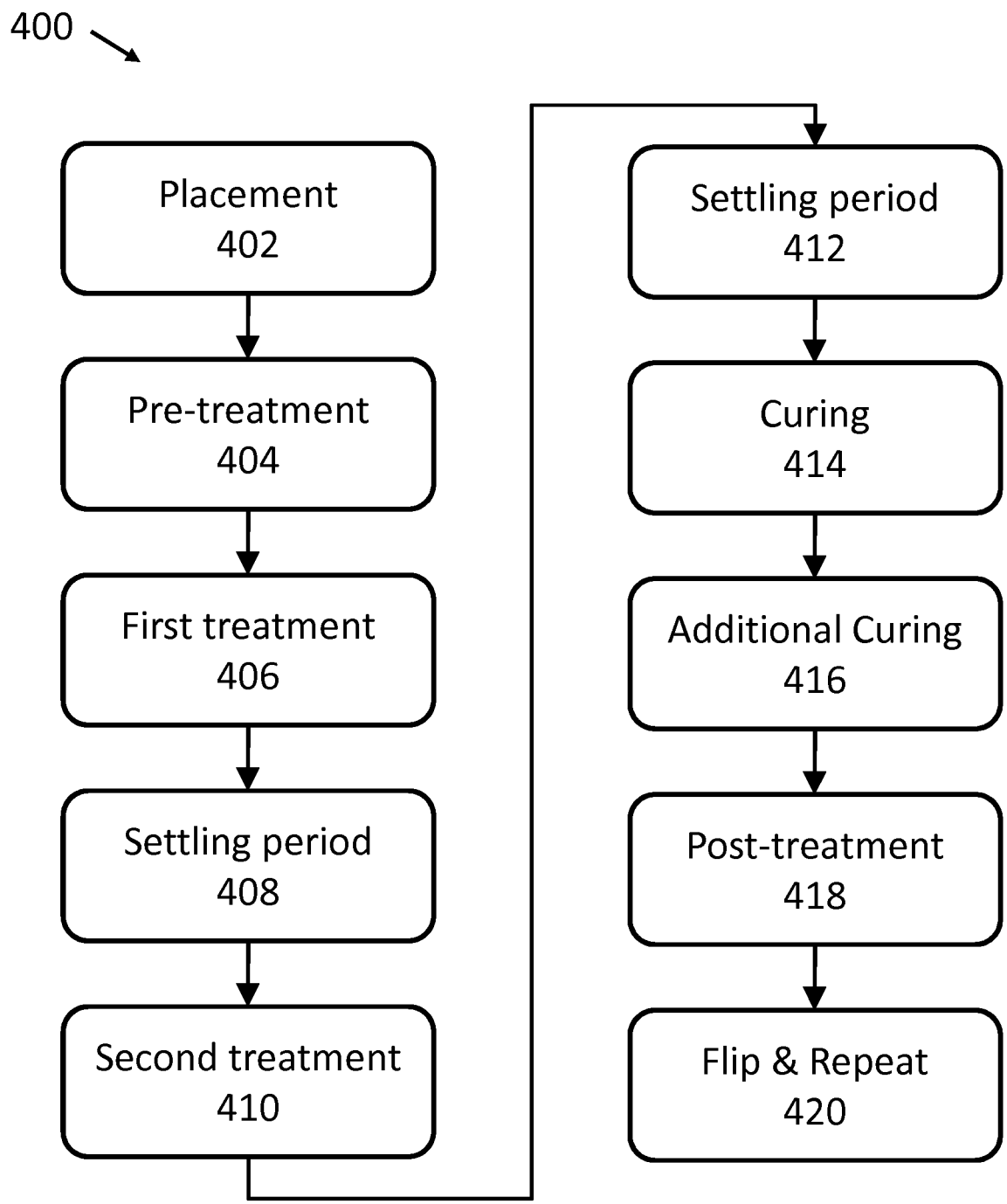
FIG. 8 is a block diagram of a treatment process that may be implemented according to disclosed embodiments.

Methods of Producing a Treated I-Joist:

FIG. 8 illustrates a diagram of one embodiment of a treatment process 400. The treatment process 400 may include a placement step 402, a pre-treatment step 404, a first treatment step 406, a settling period 408, a second treatment step 410, a second settling period 412, a curing step 414, an additional curing step 416, a post-treatment step 418, and a repeat step 420. In some embodiments of the treatment process 400, the I-joist 100 undergoes one step at a time. In other embodiments or in a different portion of the same embodiment, different portions of the I-joist 100 may simultaneously undergo different steps of the treatment process 400. For example, typical I-joists can be up to 60 feet long. For embodiments where the length of the I-joist 100 is more than spacing d, the I-joist 100 may undergo multiple different steps at once. For example, while a portion of the I-joist is undergoing the first treatment step 406, another portion may be resting in the first settling period 408, another portion may be undergoing the second treatment step 410, and yet another portion may be resting in the second settling period 412. This configuration may be advantageous in situations where concurrent processing is desired to decrease overall processing time and line inefficiency. The increase in efficiency may be especially advantageous for certain cementitious materials 210 that may quickly or easily cure within material batch tank 322. In other embodiments, it may be preferable for the I-joist 100 to undergo only one step or only certain steps at once. For example, if gentle shaking or vibration is applied to the I-joist 100 as part of first settling period 408 while the I-joist 100 is also undergoing first treatment step 406 and/or second treatment step 410, the application of the treatments during those steps may be undesirably affected.

The placement step 402 may include using the conveyer 312 for conveying the I-joist 100 through the treatment process 400. The I-joist 100 may arrive on the conveyer 312 in a variety of ways including by hand, by crane, after being run through another system, after arriving from another source or other such means of providing I-joist 100. The I-joist 100 may be placed such that the lateral walls 114 are in contact with the conveyer 312, such that the web 120 is in contact with conveyer 312 or a combination thereof. The I-joist 100 may arrive after already having certain steps of the treatment process 400 being completed.

The pre-treatment step 404 may include performing preparatory steps to prepare the I-joist 100 for the treatment process 400. For instance, prior to being treated (for example, being coated with a cementitious material), the I-joist 100 may be the subject of various processes to make a substrate 202 more receptive to treatment. The pre-treatment step 404 may include scuffing the I-joist 100 in order to increase adhesion of the cementitious material 210. Scuffing may be especially useful on the smooth, platen side 124 of the I-joist 100. Scuffing may be accomplished with, for example, a scuff sander with scuffing roles, sanding rolls, or sanding belts that include bristles or other sanding materials, which may be used to increase the amount of surface area on a portion of I-joist 100. This process may open interstitial spaces in cellulosic materials. The pre-treatment step 404 may also involve removing surface debris or dust from the substrate. Such materials may have a negative effect on adhesion of cementitious material 210 to the substrate. In addition, visual inspection or other tests may be conducted in order to calibrate later steps. For example, an imaging system can be used to calculate the dimensions and surface area of I-joist 100, which may direct a computer or user to alter one or more of the characteristics of the applications including line speed v, application pressure, application distance ad, application height ah, and application angle θ. pre-treatment step 404 may also include pre-heating or pre-cooling the I-joists 100. For example, if the I-joists 100 were stored at a temperature outside of a preferable range for treatment, the I-joists 100 may be brought into a preferable range before being treated by for example, being subjected to a warmer or cooler ambient temperature, heat lamps, and other temperature-controlling methods.

The first treatment step 406 may include applying a first application 304 to the I-joist 100. The first application 304 may provide a wetting coating of the cementitious material 210 to I-joist 100. A wetting coating may be characterized by the coating being used to create a first cementitious layer 204 on the I-joist 100 so that the cementitious material 210 may better flow into and fill imperfections in the I-joist 100 prior to a second treatment step 410 or other processes (such as curing). This wetting coating may also promote a stronger bond between the substrate and the second cementitious layer 206. The first application 304 may have various characteristics that make it conducive to applying a wetting and/or a thickening coating of cementitious material 210. For example, the application angle θ, the application distance ad, and the application height ah, may all be varied in order to provide a conducive coating. In addition, other application characteristics may be varied. For example, the application pattern may be a flat fan spray pattern, an extended range flat fan spray pattern, a wide angle flat fan spray pattern, an even spray pattern, a hollow cone spray pattern, a full cone spray pattern, a curtain coat pattern or other spray patterns chosen to be conducive to applying cementitious material 210 to the substrate.

In some embodiments, the first application 304 may be in the form of a flow coating. The cementitious material 210 may be pumped from a reservoir through hoses and out a number of orifices onto the web of the I-joist. In some implementations, the orifices may be shaped to deliver a high volume of the cementitious material at low line pressures. The line pressure may be about 3 to 18 psi or about 5 to 10 psi, which results in delivering the cementitious material to the web without atomization. The web 120 and inner flange walls 116 may act as a trough through which the cementitious material 210 flows. Such a flow of cementitious material 210 may facilitate the filling of imperfections 200 and valley regions 128. Some embodiments may apply the coating using low (or no) pressure and large nozzles to flow the cementitious material 210 on the web 120 rather than spraying the cementitious material 210. In some embodiments, the cementitious material 210 may be applied using a fan-shaped application pattern. In some embodiments, the cementitious material 210 flows without atomizing or with low atomization. In particular, in some embodiments, less than about 25%, 20%, 15%, 10%, 5%, 1% of cementitious material 210 is atomized during or after it leaves an application nozzle or other structure used to apply the cementitious material 210.

The first settling period 408 may be a settling period between the first and second treatment steps 406, 410 or between the first treatment step 406 and curing step 414 when the second treatment step 410 and settling period 412 are not used. In the first settling period 408, the I-joist 100 or portions of the I-joist 100 may be allowed to rest. This rest period may allow the first cementitious layer 204 to flow into certain imperfections in I-joist 100 and even out. By allowing the imperfections to fill-in before the introduction of other material (for example, fiberglass 208 in second treatment step 410), dry areas devoid of fire protection can be prevented. Additionally, beveled edges 130 may be points of weakness in the I-joist 100; however, by applying the cementitious material 210 to the I-joist 100 and allowing the coating to flow and even out over a sufficient period of time, the beveled edges 130 may be filled with cementitious material 210, providing the ability for the finished product to have increased strength in beveled edges 130.

The length of the settling period 408 may vary depending on the characteristics of the I-joist 100 and of the cementitious material 210. For example, if the cementitious material 210 has a high viscosity, the first settling period 408 may need to be longer to ensure cementitious material 210 has had enough time to settle. Additionally, characteristics of the substrate may be considered. For example, the depth of imperfections, the frequency of imperfections, the manufacturing process, the material used, the porousness of the material, the receptivity of the material to cementitious material 210 adhesion, and other factors may all be considered. In one embodiment, the settling period may be of 3-7 seconds. As a result of the first treatment step 406 and the first settling period 408, the cementitious material 210 may fill the imperfections and be a thickening layer.

The actual length of time of first settling period 408 may be defined by the operation of the treatment process 400. For example, the resting period may be defined by the time it takes the I-joist 100 or a portion thereof to travel from the first delivery unit 302 to the second delivery unit 306, from the first delivery unit 302 to the curing unit 314, and/or from the second delivery unit 306 to the curing unit 314. In this embodiment, the time t can be derived from spacing d and line speed v. The exact values for these variables may be calculated using standard kinematic equations including the following (assuming no acceleration):

$$v = \frac{d}{t}$$
$$t = \frac{d}{v}$$
$$d = tv$$

The following table shows example relationships between these values for embodiments where time t is between 3 and 7 seconds.

| t seconds | d feet | v feet per second |
|---|---|---|
| 3.0 | 3.00 | 1.00 |
| 3.0 | 4.50 | 1.50 |
| 3.0 | 6.00 | 2.00 |
| 4.0 | 3.00 | 0.75 |
| 5.5 | 4.50 | 0.82 |
| 6.0 | 6.00 | 1.00 |
| 7.0 | 3.00 | 0.43 |
| 7.0 | 4.50 | 0.64 |
| 7.0 | 6.00 | 0.86 |

As a specific example, one embodiment of the treatment system 300 may have a spacing d of 6 feet and a desired resting period of 3 seconds. As can be seen above, the resulting line speed v would be 2.00 feet per second. For a situation where the I-joist 100 has a length of 20 feet, an I-joist 100 can be applied with both coatings every 10 seconds. A different embodiment may have a spacing d of 3 feet, a desired resting time of 7 seconds, and a line speed v of 0.43 feet per second. An I-joist 100 with a length of 20 feet may be coated by both cementitious layers every 46.51 seconds.

In other embodiments (for example, where the length of I-joist 100 is less than spacing d) additional methods for targeting time t may be suitable. For example, the conveyer 312 may be slowed down through particular sections or stopped entirely. In yet other embodiments, the I-joist 100 may travel in a circuitous route to increase the amount of time it takes for the I-joist 100 to move across spacing d from the first delivery unit 302 to the second delivery unit 306 and/or to the curing station 314.

In some embodiments of first settling period 408, the I-joist 100 may be subjected to different conditions to assist in the settling or rest process. For example, during the first settling period 408, the I-joist 100 may be subjected to shaking, vibration, smoothing, rolling, air flow over the substrate, or a change in the ambient environment. Depending on the size and shape of the I-joist 100, the I-joist 100 may be kept level during this period or it may be tilted in a particular direction in order to encourage or discourage the flow of cementitious material 210 in particular directions. Alternatively, the settling period 408 may simply be the amount of time for the applied coating to even and settle out without external assistance. For instance, in a flow coating application, the applied coating of cementitious material 210 may be deposited as one or more non-atomized streams that naturally spread across the web and even out over the settling period.

The second treatment step 410 may be optional and may provide the second coating of cementitious material 210 to the I-joist 100 via the second application 308. The second coating may be characterized as the coating being used to provide additional thickness and may optionally include a mixture of cementitious material 210 with fiberglass 208 and/or fillers. The second coating may be referred to as a thickening layer. The addition of the fiberglass 208 may assist by providing increased internal bond strength of the coating as well as additional strength and stability of the I-joist. The fiberglass 208 can be applied in many different ways. Fiberglass 208 may be applied prior to, concurrent with, or after the second application of cementitious material 210. In some embodiments, the fiberglass 208 is applied directly onto the first cementitious layer 204 provided in first treatment step 406. Then, a second application 308 of cementitious material 210 is applied over the fiberglass 208 (e.g., using a flood or flow coating). In certain embodiments, the fiberglass may be mixed with the cementitious material 210 and applied as a mixture. Accordingly, the application of fiberglass 208 may be through the use of air blowers, propelled by the force of a mechanism in the fiberglass delivery unit 310, the fiberglass 208 may be blown onto the substrate via the application of the cementitious material 210, or through other similar means. second treatment step 410 may also include using rollers or other mechanisms to eliminate air pockets in, smooth out, fill in or otherwise promote good application of the second coating and/or fiberglass.

The exact ratio of fiberglass 208 to cementitious material 210 may vary depending on the characteristics desired, for example, the type of support desired, the coverage area, and the specific application technique. In traditional applications of fiberglass, the glass-to-resin ratio by weight may typically range from 25:75 to 50:50. However, the glass-to-cementitious-mixture ratio may have even broader acceptable ranges of variation. For example, fiberglass or other filler may account for about 0% to about 6% of the total weight of the applications, about 0.1% to about 6.0% of the total weight of the applications, about 0.1% to about 4% of the total weight of the applications, or preferably about 0.5% to about 3.0% of the total weight of the applications. Likewise, the chop size of fiberglass may vary depending on desired application. In one embodiment, the chop size may be between about 0.1875 inches and 0.625 inches.

The amount of fiberglass 208 may also vary based on the characteristics of the I-joist 100. For example, a relatively smaller amount of fiberglass 208 may be applied to I-joists 100 having a narrow web width and a relatively larger amount of fiberglass 208 may be applied to I-joists 100 having a larger web width. In some embodiments, the application of fiberglass 208 may be omitted entirely for narrow web widths. In embodiments where no fiberglass is applied, a first cementitious layer 204 may be omitted. For example, the first treatment step 406 and the first settling period 408 may be omitted from the treatment process 400 when fiberglass or a filler is not applied.

The second settling period 412 may be optional and may be a settling period between the second treatment 410 and the curing process 414, which may allow for the cementitious material 210 and/or the fiberglass 208 disposed on the I-joist 100 to settle or otherwise become in a state suitable for proper curing. As above, this temporal spacing may be accomplished in various ways such as by increasing the distance between second application delivery unit 306 and the curing station 314 or by varying the manner in which the conveyer 312 transports the I-joist 100. In some implementations, the second settling period 412 may not involve positive smoothing steps. That is, the second settling period 412 may be the time it takes the cementitious layer 204 to naturally flow and even out across the web of the I-joist 100. The curing step 414 may be a step in which the cementitious material 210 is substantially or partially solidified. Depending on the characteristics of the I-joist 100 and the type of cementitious material 210, different curing techniques or combinations of techniques may be used. For example, in one embodiment, curing may be carried out through heat treatment and/or exposure to ambient conditions. Heat treatment may include a heat that penetrates the coating, for example penetrating infrared heat. Heat treatment initiates and/or accelerates the curing processes of the coatings but may also drive-off water that contributes to fire resistance. Controlling the amount of heat to which a coated substrate is exposed may allow for controlling curing and water loss.

Both the curing rate and the water content of fire-resistant layers need to fall within acceptable ranges in order to produce efficiently a fire-resistant substrate having a specified amount of fire-resistant material with the requisite properties. An oven may provide controlled heat treatment in which substrates pass through the oven along a series of rollers, for example. Factors that may be controlled in an oven may include temperature, humidity, intensity of heating units, air speed, and transport speed.

In an embodiment where infrared radiation is delivered from lamps or burners in an oven setting, heat may penetrate through an outer surface of the cementitious material 210 to underlying material in order to initiate and/or accelerate the curing process throughout the cementitious layers 204, 206. In one example, all portions of the treated I-joist are exposed to the lamps or burners for 2 minutes in order to initiate the curing process. Thus, depending on the length of the curing station 314, the speed at which the I-joist 100 moves may be adjusted to satisfy a dwell time requirement. Curing processes in the cementitious material 210 layers on an I-joist 100 need not be fully completed before exiting a curing station 314. Instead, the exposure to heat initiates and accelerates the curing processes. It may be desirable to cure the cementitious material 210 gradually once curing has been initiated, because (in general) the longer the wet, fire-resistant material is in contact with the substrate 202, the deeper the material bond becomes. However, a cure that is too slow causes a slowdown in production. Therefore, controlling the amount of time the I-joist 100 is exposed to curing initiation temperatures (for example, in a heated oven) may allow for the curing process to proceed at a desired rate while also achieving a strong material-substrate bond, specifically a bond that is strong enough to hold-up over time and use. Typically, the I-joists 100 may sufficiently cure over a period of 1-3 hours after being exposed to oven heat for a short period of time, for example 2-4 minutes. In one embodiment, the amount of heat delivered is measured by measuring the surface temperature of the top of an I-joist 100 in the oven area. For example, it has been found that a minimum surface temperature of 150-175 degrees Fahrenheit (65-80 degrees Celsius) may initiate cure for some fire-resistant coatings. In another embodiment, the amount of heat delivered is measured by measuring the BTU s per square unit of area delivered during the time a coated substrate passes through the oven. For example, the application to the substrate of 15,000 BTUs per square foot may initiate cure.

In certain embodiments, the curing station 314 may include multiple zones where conditions may vary. For example, in a three-zone environment, a first zone may have a temperature and humidity different from the other two zones. The speed of the conveyer 312 in this area may also be controlled so that the I-joist 100 dwells in one or more of the heated environments for a set period of time. Although the preceding process related to the treatment of the cementitious material 210 with heat, similar methods may be used with other types of curing methods.

The additional curing step 416 may be an additional curing and/or drying period following the curing step 414. For example, after the curing step 414, the I-joist 100 may undergo subsequent drying or curing. After curing is initiated, the I-joists 100 may be moved to open air racks, which space the I-joists 100 apart to allow excess heat from exothermic curing to dissipate. The racks may be exposed to the ambient conditions of whatever location they are in; however, in some embodiments, the racks holding coated substrates may be placed in a conditioning area that has an environment of controlled temperature (for example, about 80° to about 100° Fahrenheit) and humidity from 40% to 70% until the drying and/or curing processes are complete, or until the curing process has progressed enough (for example, 1-3 hours) so that the substrates can safely be finished and stacked. Once cured, the cementitious layer(s) 204, 206 may be durable enough to not be substantially negatively affected if the I-joists 100 are stacked and/or shipped. In some embodiments, this process may facilitate the curing process by controlling the temperature and humidity yields a cementitious material having the requisite stability, strength, and water content for fire-barrier products. In embodiments where repeat step 420 will include rotating or flipping the I-joist 100 so that the other side of the I-joist 100 faces the application nozzles 316, I-joist 100 may be dried in a different way or for a different amount of time. For example, I-joist 100 may be dried only long enough for the layers of cementitious material 210 to sufficiently solidify to substantially resist the force of gravity when the already-coated substrate 202 faces the conveyer 312 during re-processing. In embodiments of repeat step 420 where the webbing of the I-joist 100 is in contact with the conveyer 312, the additional curing period may be of sufficient quality or duration that the cementitious material layers 204, 206 can be supported in this way. For example, the I-joist 100 may be dried such that the already-coated substrate 202 will not stick to the conveyer 312 or be deformed in an undesirable way. As another example, the I-joist 100 may be dried for a shorter than usual time because the supported or otherwise held in place by the conveyer 312 and may not need to resist the force of gravity. The curing time may vary depending on a variety of circumstances including the curing method. For example, the curing time may be between about three to about five hours in an uncontrolled environment. In a controlled environment of, for example 80° to 100° Fahrenheit, the time may be between about one to two hours. Other curing methods and devices may be used; for example, see U.S. Pat. No. 7,595,092, entitled "System and Method for Coating a Fire-Resistant Material on a Substrate," which issued on Sep. 29, 2009; and U.S. Pat. No. 7,921,800, entitled "System and Method for Coating a Fire-Resistant Material on a Substrate," which issued on Apr. 12, 2011, each of which are incorporated herein by specific reference in their entirety for all purposes.

The post-treatment step 418 may include an optional post-treatment finishing period. In certain embodiments, finishing the cured and coated substrates may include trimming excess materials from the substrate 202. For example, a cementitious layer 204, 206 may be smoothed or otherwise treated for some cosmetic purpose. The I-joists 100 may be labeled in accordance with inventory or safety requirements. Finished I-joists 100 may be stacked for subsequent sanding, painting, texturing, veneering, or other manufacturing, for example. Whether the post-treatment step 418 is performed may depend on various factors including whether both sides of I-joist 100 were treated or just one side. For example, if the I-joist 100 will be put through the process again, it may not be suitable to perform certain post-treatments until treatment process 400 is over.

The repeat step 420 may be an optional step of rotating or flipping I-joist 100 so that an untreated side of I-joist 100 is exposed and then repeating some of the previous steps. Whether repeat step 420 is performed depends on various factors including whether I-joist 100 has already been flipped, whether both sides of I-joist 100 need to be treated, and whether multiple layers of coating are desired. During the subsequent performance of placement step 402 through post-treatment step 418, some of the previously described steps may be altered to take into account changed circumstances. For example, the curing or additional curing steps, curing step 414 and additional curing step 416 respectively, may have altered the properties of the material of I-joist 100. These changed properties may make the substrate more or less receptive to the application of cementitious material 210 and other steps may need to be modified.

While this disclosure describes exemplary embodiments, various changes can be made and equivalents may be substituted without departing from the spirit and scope thereof. For example, while some embodiments above may describe the application of fiberglass 208, other suitable filler materials can be used. In other embodiments, I-joist 100 is not an I-joist and instead may be a portion of an unassembled I-joist (for example, just the webbing) or a different building material altogether (for example, dimensional board).

Additionally, while cementitious material 210 has been described as being applied by an application, other application methods, including curtain coating, roll coating, brush coating, manual coating, are also possible. The first delivery unit 302 and/or the second delivery unit 306 may be replaced with other systems or methods of applying the cementitious material 210. For example, the cementitious material 210 may be delivered via a pliable carrier veil in a traveling web, where the carrier veil web is drawn through a reservoir and coated with the cementitious material such that the veil is coated, and the veil may be deposited on the substrate. This method may also include controlling the amount of the cementitious material on the carrier veil web, where controlling includes setting a nip dimension between a nip formed between two rollers, passing the carrier veil through the nip of the two rollers and providing cementitious material 210 as a material suitable to coat the veil exiting the nip with a layer effective to provide a selected fire resistance, and applying heat to the coated carrier veil sufficient to accelerate a curing reaction in the fire-resistant substance. A similar veil coating process may be used to deposit other filler onto the substrate such as the processes disclosed in U.S. Pat. Nos. 7,595,092 and 7,921,800 previously incorporated by reference.

As understood by those skilled in the art, modifications can also be made to adapt these teachings to different situations and applications, and to the use of other materials and methods, without departing from the essential scope of the invention. The invention is thus not limited to the particular examples that are disclosed, and encompasses all of the embodiments falling within the subject matter of the appended claims.

What is claimed is:

1. A building component, comprising:
a substrate with a length and a first side and a second side extending between an upper edge and a lower edge;
an upper support attached to the upper edge;
a lower support attached to the lower edge;
a first layer of cementitious material covering the first side of the substrate and at least a portion of the upper support and the lower support, wherein the first layer of cementitious material varies in thickness from a thin region on the first side positioned approximately midway between the upper support and the lower support to thicker regions positioned proximate to the upper support and the lower support;
a second layer of cementitious material covering the second side of the substrate and at least a portion of the upper support and the lower support, wherein the second layer of cementitious material varies in thickness from a thin region on the second side positioned approximately midway between the upper support and the lower support to thicker regions positioned proximate to the upper support and the lower support;
a third layer of cementitious material overlaying the first layer of cementitious material covering the first side of the substrate and at least a portion of the upper support and the lower support, wherein the third layer of cementitious material varies in thickness from a thin region on the first side positioned approximately midway between the upper support and the lower support to thicker regions positioned proximate to the upper support and the lower support; and
a fourth layer of cementitious material overlaying the second layer of cementitious material covering the second side of the substrate and at least a portion of the upper support and the lower support, wherein the fourth layer of cementitious material varies in thickness from a thin region on the second side positioned approximately midway between the upper support and the lower support to thicker regions positioned proximate to the upper support and the lower support;
wherein the cementitious material in the first layer is the same as the cementitious material in the third layer, and the cementitious material in the second layer is the same as the cementitious material in the fourth layer.

2. The building component of claim 1, wherein the combined thickness of the corresponding thicker regions of the first layer and third layer is configured to reinforce or strengthen the attachment of the substrate to the upper support and the lower support; and
wherein the combined thickness of the corresponding thicker regions of the second layer and fourth layer is configured to reinforce or strengthen the attachment of the substrate to the upper support and the lower support.

3. The building component of claim 1, wherein the substrate is rectilinear.

4. The building component of claim 1, wherein the substrate is elongated, with the upper edge and lower edge forming the length of the substrate.

5. The building component of claim 1, wherein the substrate comprises manufactured wood.

6. The building component of claim 1, wherein the substrate comprises OSB.

7. The building component of claim 1, wherein the upper support and lower support are elongated, with a length approximately equal to the length of the substrate.

8. The building component of claim 7, wherein the building component comprises an I-joist.

* * * * *